(12) United States Patent
Froment et al.

(10) Patent No.: US 6,877,778 B2
(45) Date of Patent: *Apr. 12, 2005

(54) LINEARLY ACTUATED QUICK CONNECT PIPE COUPLINGS

(75) Inventors: Jean-Paul Froment, Doussard (FR); Jean-Jacques Lacroix, Lovagny (FR); Antoine Chambaud, Giez (FR)

(73) Assignee: Staubli Faverges, Faverges (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/287,472

(22) Filed: Nov. 5, 2002

(65) Prior Publication Data

US 2003/0085572 A1 May 8, 2003

(30) Foreign Application Priority Data

Nov. 6, 2001 (FR) .............................. 01 14346

(51) Int. Cl.[7] .............................................. F16L 19/00
(52) U.S. Cl. ..................... 285/361; 285/402; 285/362
(58) Field of Search ........................... 285/361, 91, 83, 285/86, 362, 401, 402; 137/614.02, 614.04

(56) References Cited

U.S. PATENT DOCUMENTS

| | | | | |
|---|---|---|---|---|
| 1,622,216 A | * | 3/1927 | Anlauf et al. ................ | 285/361 |
| 1,871,370 A | * | 8/1932 | Jacques ........................ | 285/361 |
| 2,327,503 A | * | 8/1943 | Coberly ....................... | 285/361 |
| 2,799,344 A | | 7/1957 | Muse | |
| 3,097,001 A | * | 7/1963 | Le Bus, Sr. ................. | 285/361 |
| 3,211,479 A | | 10/1965 | Brown | |
| 3,625,251 A | * | 12/1971 | Nelson .................. | 137/614.04 |
| 3,858,910 A | | 1/1975 | Oetiker | |
| 4,199,210 A | | 4/1980 | Trott | |
| 4,278,278 A | | 7/1981 | Chambless et al. | |
| 4,313,626 A | * | 2/1982 | Duncan ........................ | 285/86 |
| 4,566,723 A | * | 1/1986 | Schulze et al. ............... | 285/86 |
| 5,009,252 A | * | 4/1991 | Faughn ................... | 137/614.04 |
| 5,029,973 A | | 7/1991 | Rink | |
| 5,087,086 A | * | 2/1992 | Snedeker ..................... | 285/361 |
| 5,451,031 A | | 9/1995 | Purvis et al. | |
| 5,466,020 A | * | 11/1995 | Page et al. ................... | 285/361 |
| 5,741,084 A | * | 4/1998 | Del Rio et al. ............. | 285/361 |
| 5,889,228 A | * | 3/1999 | Ewick et al. ............. | 102/275.5 |
| 6,173,742 B1 | * | 1/2001 | Smith, III .............. | 137/614.04 |

FOREIGN PATENT DOCUMENTS

| | | |
|---|---|---|
| CH | 405839 | 1/1966 |
| DE | 508311 | 9/1930 |
| EP | 1164327 | 12/2001 |

* cited by examiner

Primary Examiner—David Bochna
(74) Attorney, Agent, or Firm—Dowell & Dowell, P.C.

(57) ABSTRACT

Linearly actuated quick connect pipe couplings which include a male element and a female element adapted to fit into each other along a principal axis. One of the elements includes at least one ramp for receiving a radial projection mounted to the other element which locks the elements together by axial movement of the elements relative to one another. One of the ramp or the projection is formed with a ring mounted to rotate but is fixed in translation along the principal axis of one of the male or female elements. The ramp forms a first seat for locking the projection when the coupling is in a configuration to permit fluid passage and a second seat, offset axially with respect to the first seat, for locking the projection when the coupling is in a configuration to permit decompression of fluid within the coupling.

13 Claims, 8 Drawing Sheets

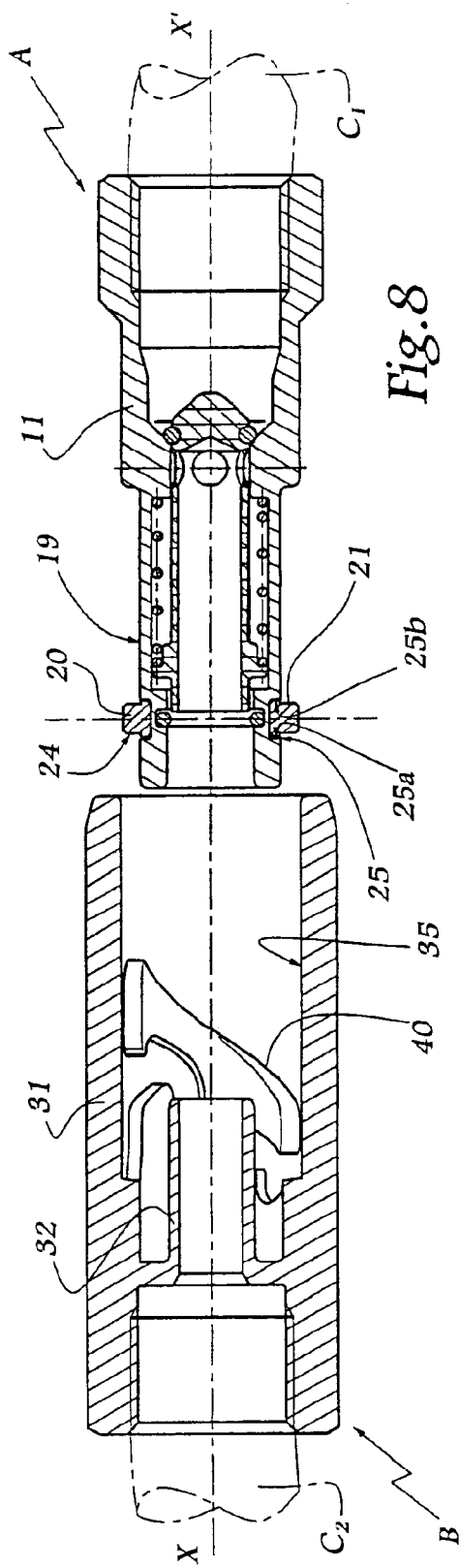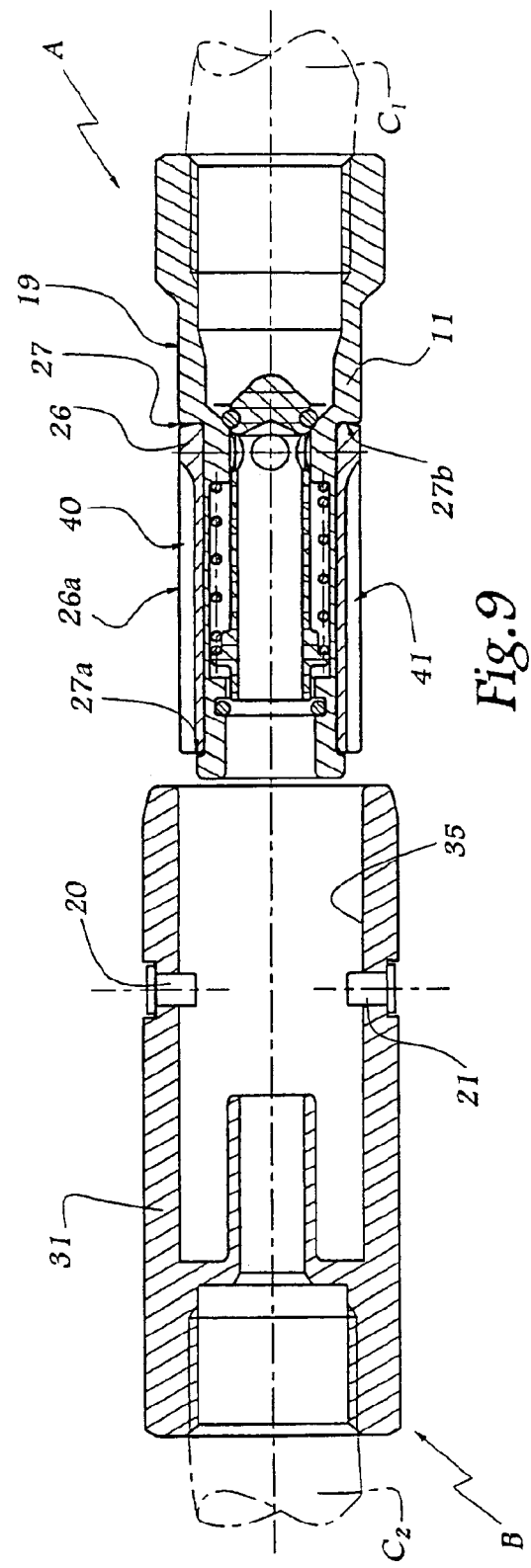

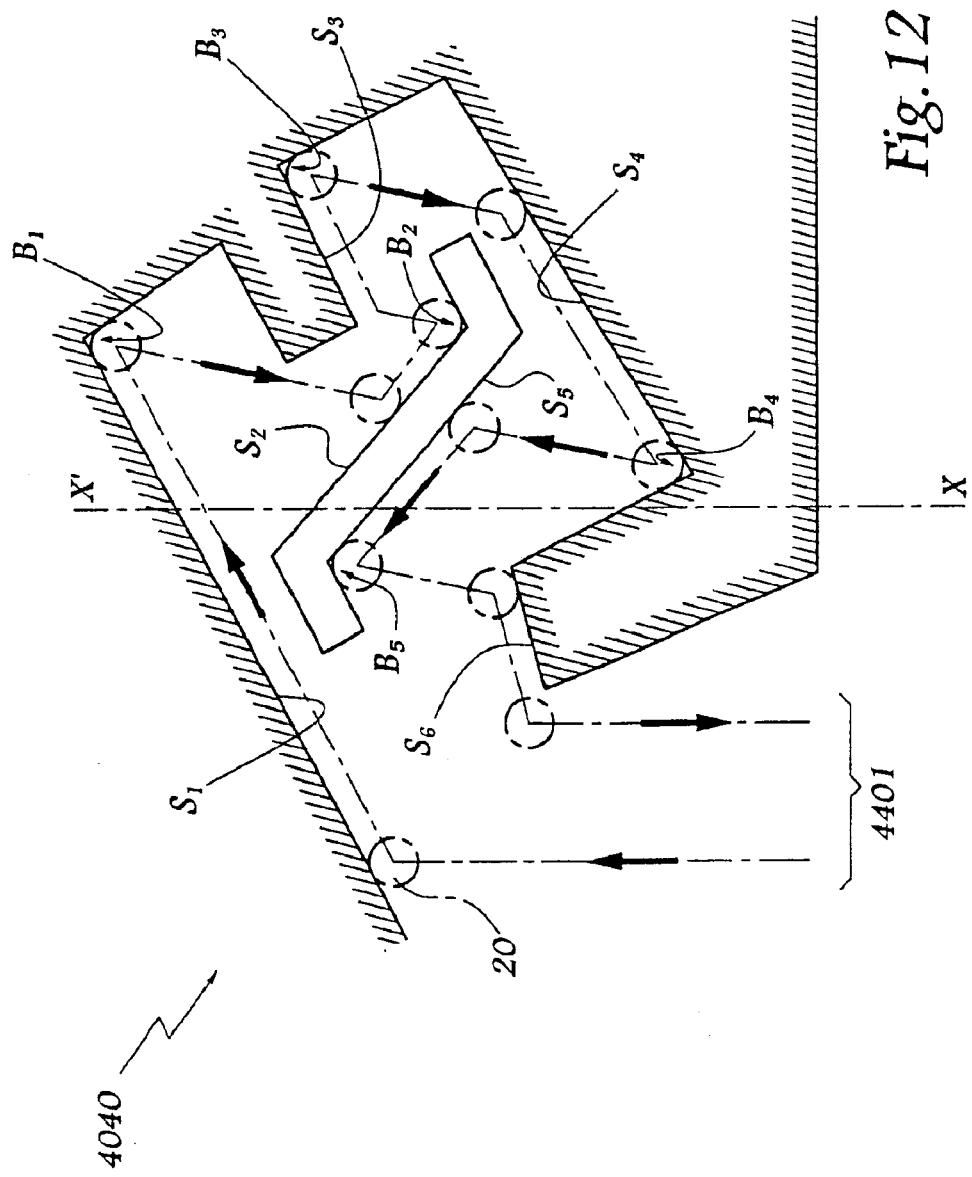

LINEARLY ACTUATED QUICK CONNECT PIPE COUPLINGS

BACKGROUND OF THE INVENTION

Field of the Invention

The present invention relates to a quick connect coupling which comprises elements adapted to fit in one another for the joining of two pipes through which a fluid flows under pressure.

DESCRIPTION OF THE RELATED ART

It is known to provide a quick connect coupling with an outer button intended to control a mechanism for locking a male element of the connection inside a female element to permit a selective release of the male element. The effort of maneuvering such a button increases with the diameter of the connection and the pressure of the fluid transiting in this connection, as the locking mechanism comprises a spring whose stiffness constant increases as a function of these values. In addition, such locking mechanisms incorporating a button are relatively precise and expensive mechanisms.

It is also known to use connections incorporating balls and a locking bush, the balls being controlled by the position of the bush around one of the elements of the connection. Such connections require a free volume around the connections sufficient for maneuvering the bush, such a volume not always being available.

It is also known, for example by U.S. Pat. No. 4,909,545, to provide on the body of a connection element ramps for receiving catches protecting radially from the body of the other element. The locking of the connection requires a combined relative movement of translation and of rotation of its constituent elements, which may reduce the reliability of the assemblies made.

Finally, U.S. Pat. No. 3,211,479 discloses providing, on a connection, a sleeve adapted to penetrate in a bush equipped, on its inner surface, with studs provided to cooperate with ramps made on the outer surface of the sleeve. Upon opening of this connection, there exists a risk of a dangerous movement of a flexible pipe connected to the downstream side of the connection because of the pressure within this pipe.

It is a particular object of the invention to overcome these drawbacks by proposing a novel type of connection which allows locking and unlocking without too great an effort, including in the case of a connection with large diameter and for fluids under high pressure, while it is not necessary to manipulate the connection in rotation in order to connect or disconnect the connection.

SUMMARY OF THE INVENTION

To that end, the invention relates to a quick connect coupling for joining two pipes, wherein the coupling includes first and second elements adapted to fit in each other along a principal axis. One of the first or second element includes at least one ramp for receiving a radially projecting part of the other element, with a view to locking these elements. Either the projecting part or the ramp is formed with a ring mounted on one of these elements, which ring is free to rotate but be in fixed translation along the principal axis of the connection. The ramp forms at least one first seat for locking the projecting part when the connection is in a configuration to permit fluid passage and a second seat, offset radially with respect to the first seat, for locking the projecting part in a configuration which permits decompression or venting of the downstream pipe of the connection.

Thanks to the invention, the movement of locking and of unlocking of the connection, with a stop in the decompression configuration, may be essentially effected along an axial direction, without necessitating rotation by the user. In effect, the rotation corresponding to the locking is obtained by the automatic rotating movement of the ring with respect to the element on which it is mounted, whereas decompression or venting is obtained by blocking the projecting part on the second seat.

Within the meaning of the present invention, the notion of "fixed in translation" means that the ring is immobilized axially between two stops. Of course, a certain clearance remains admissible, which corresponds to a possibility of axial movements of low amplitude for the ring.

Other advantageous aspects of the invention will be apparent from the accompanying claims.

The invention can be used with different embodiments.

According to a first embodiment of the invention, the ramp is formed on the inner radial surface of a ring which is mounted free to rotate and fixed in translation within the female element of the connection, whereas the projecting part is fixed with respect to the male element.

According to a second embodiment of the invention, the ramp is formed on the internal radial surface of a body of the female element of the connection, whereas the projecting part is fixed with a ring which is mounted free to rotate and fixed in translation around the male element.

According to a third embodiment of the invention, the ramp is formed on the external radial surface of a ring which is mounted free to rotate and fixed in translation around the male element of the connection, whereas the projecting part is fixed with respect to the female element and protrudes radially towards its internal volume.

According to a fourth embodiment of the invention, the ramp is formed on the external radial surface of the male element of the connection, whereas the projecting part is fixed with a ring which is mounted free to rotate and fixed in translation within the female element, the projecting part protruding radially towards the internal volume of this female element.

BRIEF DESCRIPTION OF THE DRAWINGS

The invention will be more readily understood on reading the following description of six forms of embodiment of a quick connection in accordance with its principle, given solely by way of example and made with reference to the accompanying drawings, in which:

FIG. 8 is a view similar to FIG. 1, for a connection according to a second form of embodiment of the invention.

FIG. 9 is a view similar to FIG. 1, for a connection according to a third form of embodiment of the invention.

FIG. 12 is a view similar to FIG. 7, for a connection according to a sixth form of embodiment of the invention

DESCRIPTION OF PREFERRED EMBODIMENTS

Figure 1:
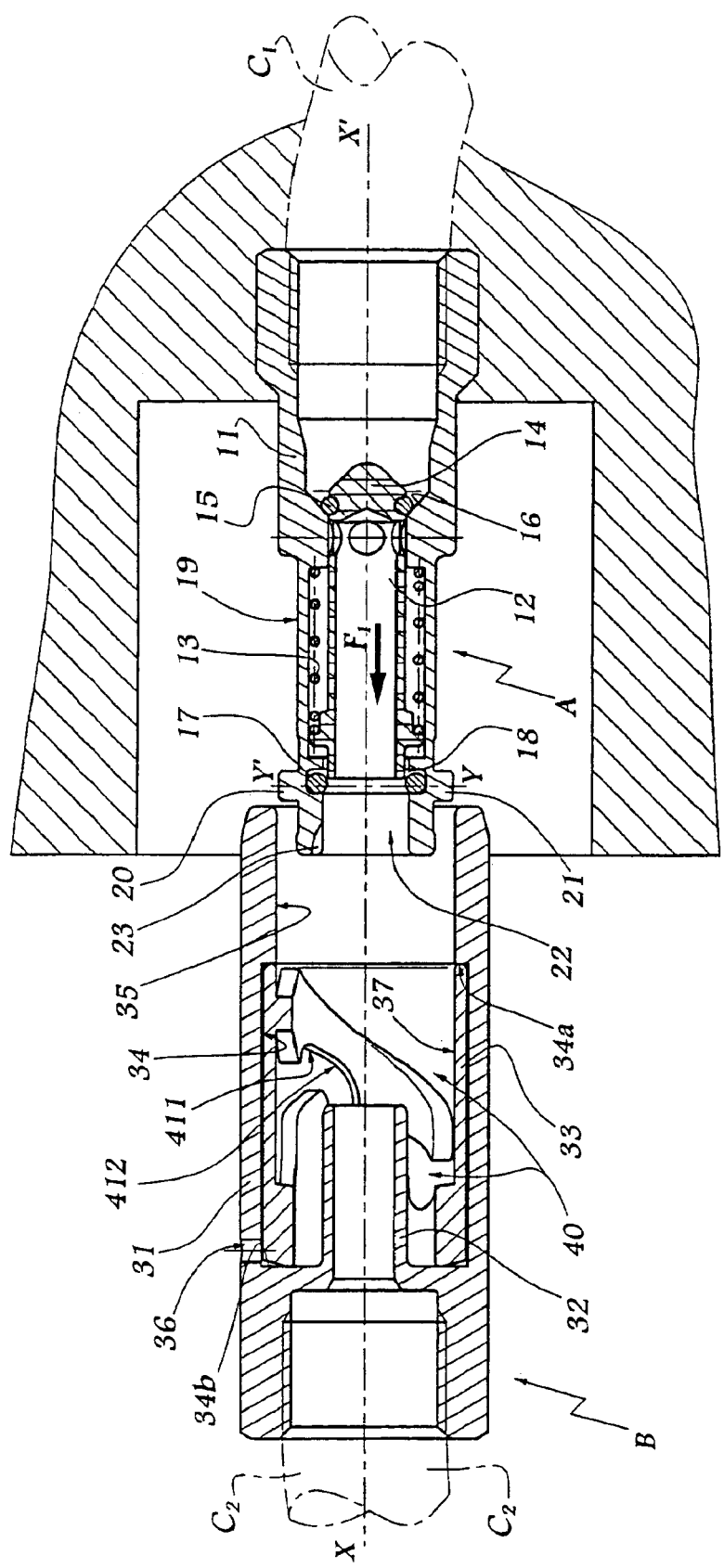
FIG. 1 is a longitudinal section through a connection according to the invention, in uncoupled configuration.

Referring now to the drawings, the connection shown in FIGS. 1 to 5 comprises a male element A and a female element B both provided to be of substantially cylindrical shape with circular cross-section. The rear part of the male element A is fluidically connected to a first pipe $C_1$, or upstream pipe, while the rear part of the female element B is connected to a second pipe $C_2$, or downstream pipe.

X-X' denotes the principal axis of the connection formed by the elements A and B, i.e. the principal axis of the elements A and B in the configurations of FIGS. 1 to 4, in a direction in which these elements may be fitted in each other.

The element A comprises a body 11 inside which is arranged a valve 12 elastically loaded by a spring 13 exerting an effort $F_1$ tending to apply a head 14 of the valve 12 equipped with an O-ring 15 against a seat 16 formed by the body 11. A second O-ring 17 is provided in an annular groove 18 made inside the body 11. On its outer radial surface 19, the body 11 is provided with two catches 20 and 21 diametrally opposite with respect to each other and extending in a direction Y-Y' substantially perpendicular to the axis X-X'. The catches 20 and 21 are in one piece with the body 11.

The element B comprises a body 31 forming a pusher 32 provided to penetrate in the inner volume 22 of the body 11 and to push the valve 12 against the effort $F_1$.

A ring 33 is mounted in a housing 34 provided in the inner radial surface 35 of the body 31, the ring 33 being free to rotate with respect to the body 31 about the axis X-X' and fixed in translation with respect to this body along this axis, due to its bearing against the opposite edges 34a and 34b of the housing 34.

A bore 36 connects the housing 34 to the outside of the element B, through the body 31.

On its inner radial surface 37, the ring 33 is provided with two ramps 40 and 41 hollowed in the surface 37. The geometry of the ramp 40 is developed in FIG. 5 where the trace of the catch 20 is represented in several positions, in dashed and dotted lines.

The ramp 40 comprises an inlet section 401 converging in the direction of a passage 402 extending substantially in a direction parallel to axis X-X'. A curved part 403 is also provided, this part extending in a hollow 404 of which the radius of curvature is such that it may receive and serve as stop for the catch 20.

When the male element A is being fitted in the female element B, the catch 20 advances in the section 401 in the direction of the passage 402, as represented by arrows $F_2$, $F'_2$ and $F''_2$ which correspond to different possible angular orientations of the catches 20 with respect to the ring 33 at the beginning of fit.

In practice, the advance of the catch 20 corresponds to a relative movement of the catch with respect to the ring 33, because the ring rotates about axis X-X'.

The catch 20 then arrives in the passage 402, then follows the curved part 403 as represented by arrow $F_3$, with the result that it arrives into abutment in the hollow 404. The configuration is in that case that of maximum fit of the male element A in the female element B.

The user perceives that he has attained the maximum stroke and can release element A or element B, depending on which one he has in his hand. In that case, the effort $F_3$, tends to push the pusher 32 towards the outside of the volume 22, which induces a relative displacement of the male and female elements in the sense of opening. This involves a displacement of the catch 20 in the ramp 40 in the direction of a surface 405 inclined with respect to axis X-X', such displacement being represented by arrow $F_4$. When the catch 20 is in abutment against the surface 405 and taking into account the orientation of this surface with respect to axis X-X', the catch 20 slides against this surface until it is immobilized in a second hollow 406 of which the geometry is such that it, can serve as seat for locking the catch 20 in the ramp 40.

Figure 2:
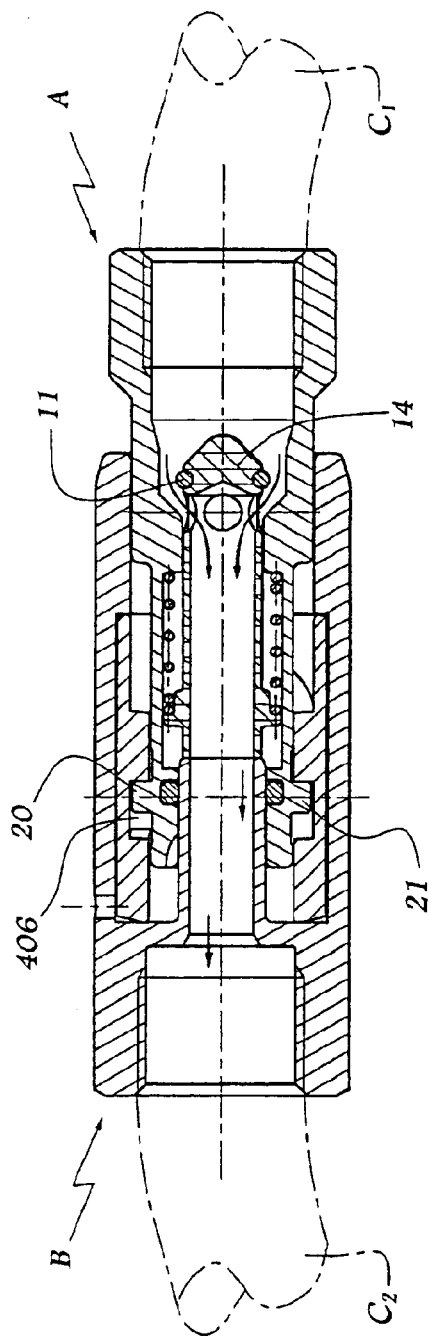
FIG. 2 is a view similar to FIG. 1, with the connection in configuration of passage.

With this position of the catch 20 in the ramp 40, the elements A and B are coupled in the position of FIG. 2, which means that the connection allows for fluid passage. A high pressure of the fluid transiting through the connection has no negative influence on the reliability of the relative immobilization of elements A and B.

Arrow $F_5$ represents the progress of the catch 20 along the surface 405.

When it is desired to uncouple elements A and B, it suffices for the user to exert a fresh axial effort of fit of the male element in the female element, which has the effect of bringing the catch 20 into contact with a surface 407 which is inclined with respect to axis X-X' in a direction opposite to surface 405. The corresponding relative movement of the catch 20 is represented by arrow $F_6$ in FIG. 5. The surface 407 extends in a hollow 408 forming a stop, like hollow 404, the movement of the catch 20 along the surface 407 being represented by arrow $F_7$.

When the user feels that he has reached the position of maximum fit of elements A and B again, it suffices for him to release the element which he is holding in his hand, for the catch 20 to be driven from the hollow 408 under the effect of the effort $F_1$, this being represented by arrow $F_8$.

The ramp 40 comprises a second passage 409 substantially parallel to axis X-X', this passage extending in a curved part 410 which opens out on a hollow 411 forming a second seat for locking the catch 20. 412 denotes the outer surface of the ramp 40 at the level of the curved part 410, this surface making it possible to guide the catch 20 in the direction of the hollow 411, as represented by arrow $F_9$.

A distance $d_1$, taken parallel to axis X-X', between the center of the catch 20, when it is in the hollow 404 and in the hollow 406, corresponds to the "excess stroke" made during fitting of the elements A and B.

Figure 5:
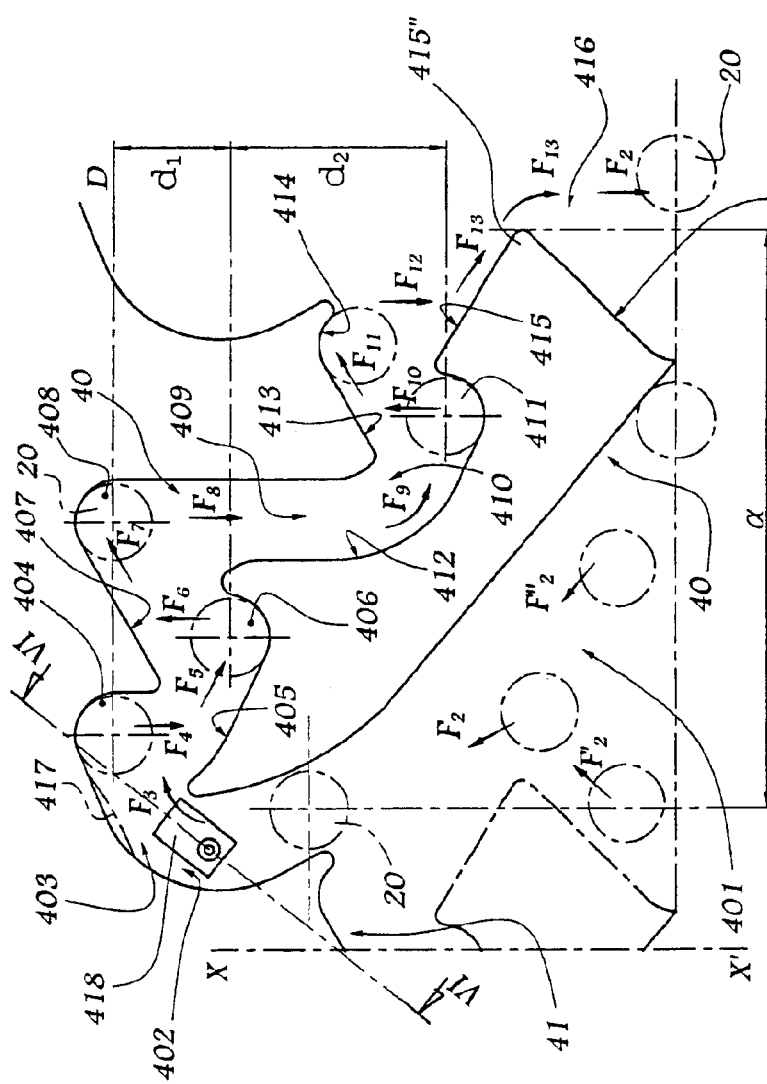
FIG. 5 is a developed view of a ramp of the connection of FIGS. 1 to 4.

The hollows 404 and 408 are substantially aligned in a direction D perpendicular to axis X-X', in FIG. 5, with the result that the distance $d_1$ also corresponds to the distance, taken parallel to axis X-X', between the center of the catch 20, respectively, in place in the hollows 406 and 408. However, such alignment of the hollows 404 and 408 is not always necessary.

Figure 3:
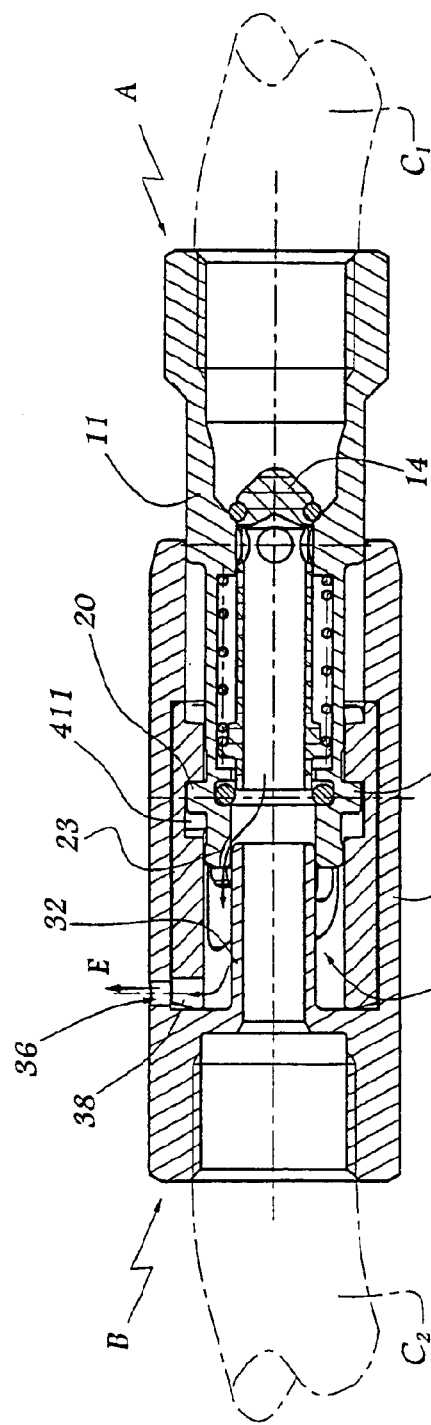
FIG. 3 is a view similar to FIG. 1, with the downstream pipe associated with the connection in configuration of decompression.
Figure 4:
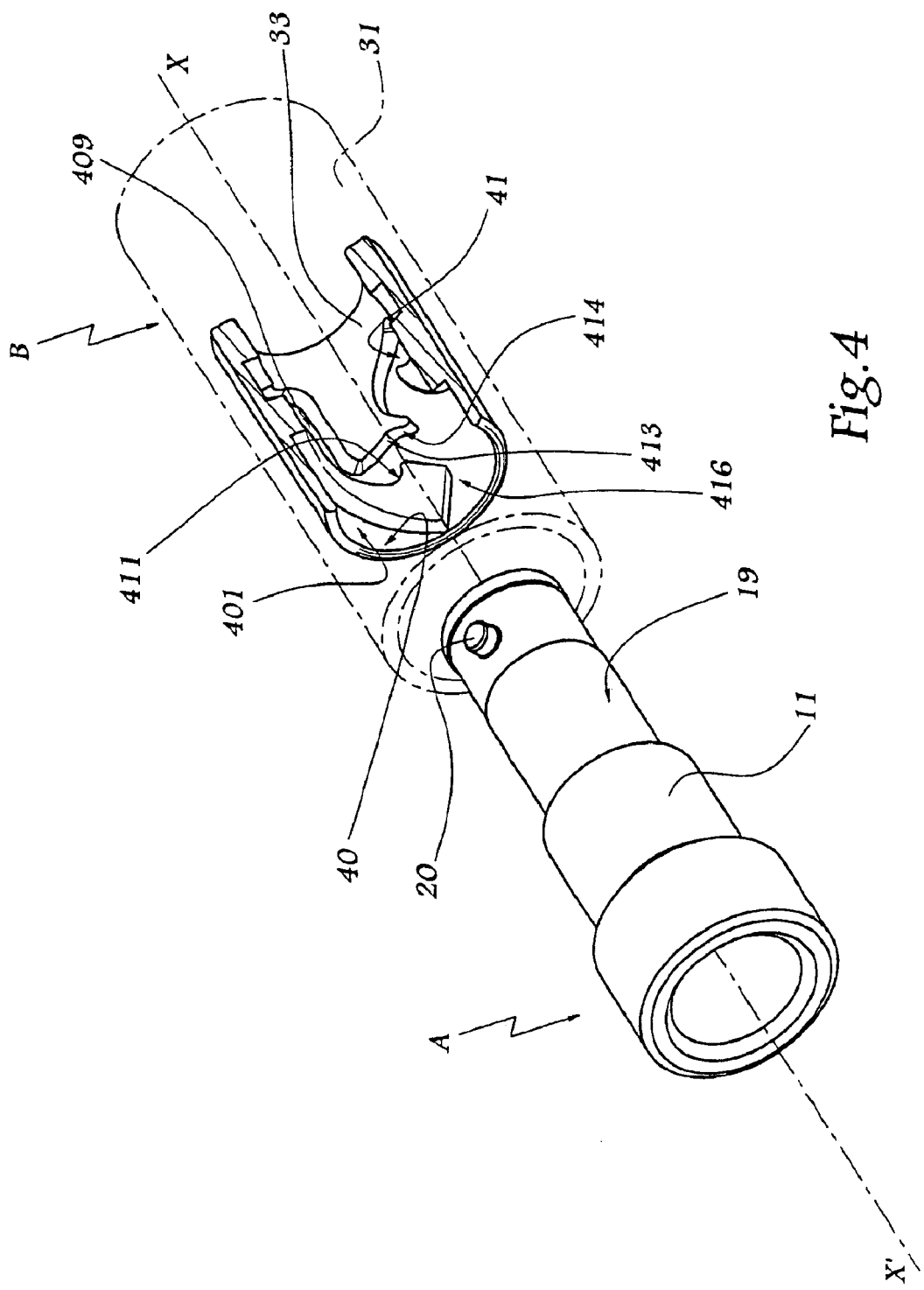
FIG. 4 is a view in partial perspective of the connection of FIGS. 1 to 3, the female element being shown partially in dashed and dotted lines and with a part torn away.

A distance $d_2$, taken parallel to axis X-X', between the center of the catch 20, respectively, in place in the hollows 406 and 411 is chosen so that, when the catch 20 is in place in the hollow 411, the connection is in the configuration of FIG. 3, in which the pusher 32, although still engaged in the volume 22, does not overlap a notch 23 provided on the body 11, this allowing a flow of the fluid present in the downstream pipe $C_2$ in the direction of a volume V made around the pusher 32 and inside the body 31. A notch 38 provided on an edge of the ring 33 allows an evacuation of the fluid towards the outside of the connection, through the bore 36, such flow being represented by arrows E in FIG. 3.

When pipe $C_2$ has been drained, it suffices for the user to exert a fresh effort of axial fit of elements A and B, which has the effect of displacing the catch 20 in the direction of a surface 413 inclined with respect to axis X-X' in the same direction as surface 407, this being represented by arrow $F_{10}$ in FIG. 5. The catch then advances along this surface, as represented by arrow $F_{11}$, and reaches a third hollow 414, from which the catch 20 may be displaced, as represented by arrow $F_{12}$, in the direction of a surface 415 inclined with respect to axis X-X' in the same direction as the surfaces 405 and 412. The catch 20 may then slide along this surface in the direction of the outlet opening 416 of the ramp 40, as represented by arrow $F_{13}$.

The opening 416 corresponds, in fact, to the inlet opening of the ramp 41. The angle α between the openings 401 and 416 is, in effect, equal to about 180°, each of the ramps 40 and 41 extending substantially over an inner semi-circumference of the ring 33.

From its position in the opening 416, the catch 20 may easily be withdrawn from the ramp 40.

The surface 415 defines, with a surface 415' inclined in the opposite direction with respect to axis X-X', a nose 415" substantially aligned axially with the hollow 414. This nose opposes an axial introduction of the catch 20 towards the hollow 414 and deflects it towards the section 401 and the passage 402, which is represented by arrow $F'_2$ in FIG. 5.

Taking into account the geometry of the ramp 40 and that of the ramp 41 which is similar, an efficient locking of the catches 20 and 21 with respect to the female element B is obtained by exerting solely substantially axial efforts, i.e. parallel to axis X-X', on one or the other of the male or female elements of the connection. The advance of the catch 20 in the ramp 40, as represented by arrows $F_2$ to $F_{12}$, is therefore obtained by the essentially axial movements of one of these elements.

It is therefore possible to make the connection according to the invention without having lateral access to one of the connection elements, for example in the event of one of these elements being embedded, as represented in dashed and dotted lines, for element A, in FIG. 1.

In addition, the ring 33 is mechanically protected against shocks and pollution by the body 31. The catches 20 and 21 being in one piece with the body 11, the endpiece A is very robust and may be mounted at the end of a flexible pipe.

In order to improve reliability of the locking at the moment of passage of the catch 20 in the curved part 403, the outer surface 417 of this part may be provided to be incurved towards the inside of the ramp 40, as represented in dashed and dotted lines in FIG. 5, this inducing an acceleration of the relative speed of the catch with respect to the ramp after the passage of the catch at the level of the apex of the incurved part 417. This avoids a release of the axial effort in the direction of the hollow 404, hence the insurance that the catch 20 comes into abutment in this hollow.

In the passage 402 there may be provided an elastic blade 418 fixed by a rivet 419 or any other means in the bottom 420 of the ramp 40, this blade 418 tending, under the effect of its own elasticity, to detach its free end 418a with respect to the bottom 420, as represented by arrow $F_{14}$.

Figure 6:
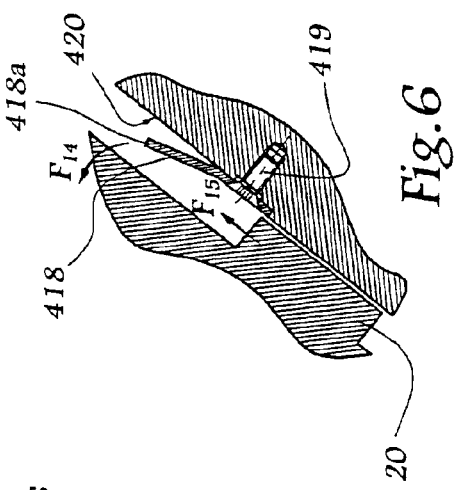
FIG. 6 is a partial section, on a larger scale, along line VI—VI of FIG. 5.

When a catch 20 advances in the direction of the hollow 404 as represented by arrow $F_{15}$ in FIG. 6, it pushes the end 418a of the blade 418 in the direction of the bottom 420, thanks to an elastic deformation of this blade. On the other hand, if the catch 20 returns in the direction of the passage 402 from the hollow 404, it abuts on the blade 418 without being able to bend it down towards the bottom. The blade 418 therefore constitutes a non-return device of the catch 20 during the advance in the ramp 40, which imposes the direction of advance of the catch 20 in the ramp 40 from the inlet section 401 up to the outlet opening 416. In particular, it is not possible to uncouple the connection without passing the catch 20 via the second seat or hollow 411, which allows a decompression of the downstream pipe $C_2$.

Figure 7:
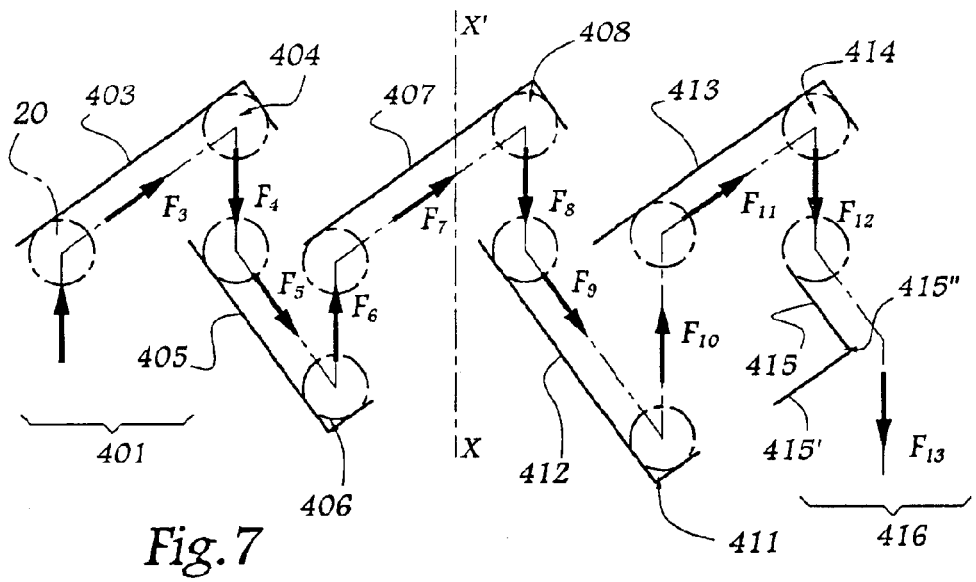
FIG. 7 is a schematic representation of the development of the ramp shown in FIG. 5.

As is more particularly visible in FIG. 7, the different surfaces 403, 407 and 413, which lead to the hollows 404, 408 and 414 and are inclined with respect to axis X-X', are respectively opposite the surfaces 405 and 412, which lead to the seats 406 and 411 and are inclined in the opposite direction with respect to this axis.

In this way, when axial movements are exerted on one of the parts constituting the connection, which is translated by displacements in the direction of the vertical arrows in FIG. 7, one of these surfaces is attained, either from a hollow or from a seat.

In other words, the surfaces for respectively guiding towards the hollows or towards the seats, are axially aligned with seats or hollows in which the catches may change direction or rest.

Figure 10:
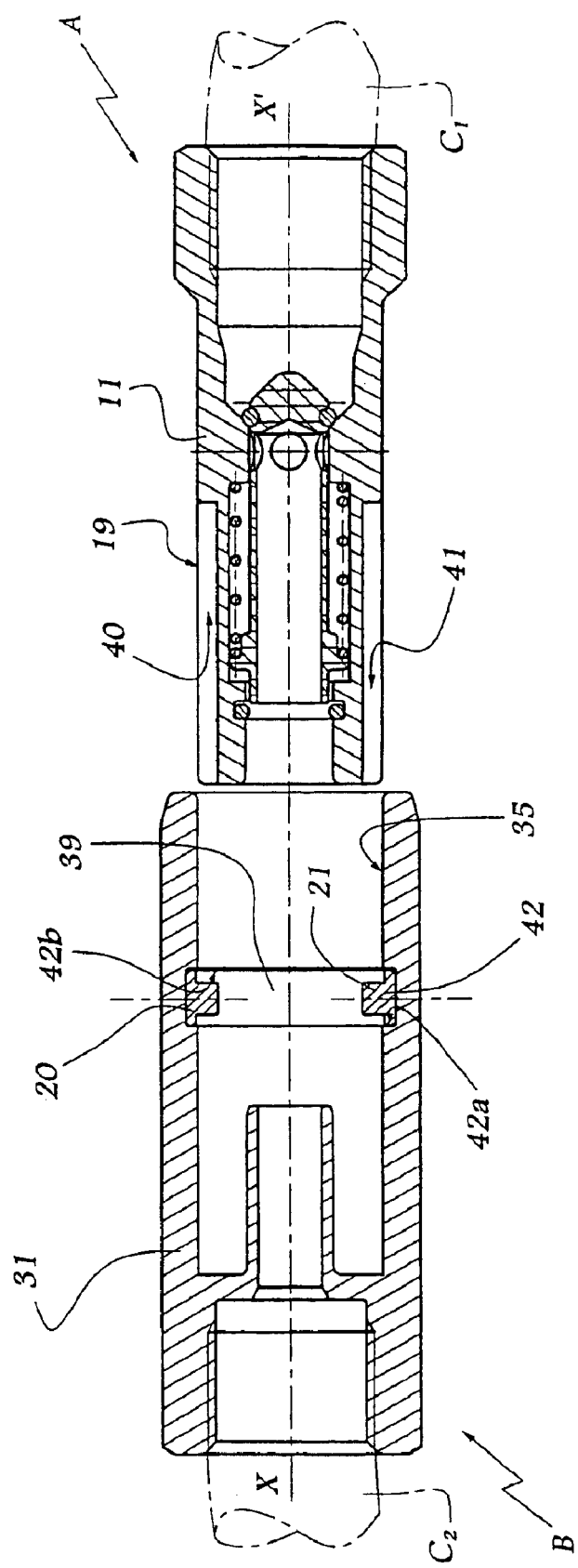
FIG. 10 is a view similar to FIG. 1, for a connection according to a fourth form of embodiment of the invention.

In the second, third and fourth embodiments of the invention, shown respectively at FIGS. 8 to 10, the elements similar to the ones of the first embodiment have the same references.

The second embodiment is different from the first one by the fact that the ramps, only one of which is to be seen on FIG. 8 with reference 40, are made on the internal radial surface 35 of the body 31 of the female element, whereas the diametrally opposed catches 20 and 21 are formed on a ring 24 which is mounted in a groove 25 formed on an external radial surface 19 of the body 11. Locking of the male and female elements A and B is obtained by rotation of the ring 24 around the longitudinal axis X-X' of the connection, the ring being fixed in translation along this axis by abutment against the opposite sides 25a and 25b of the groove 25.

In the third embodiment, two catches 20 and 21 are fixed on the body 31 of the female element B and protrudes with respect to the surface 35 towards the axis X-X'. A ring 26 is provided within a groove 27 formed on the external radial surface 19 of the body 11, this ring forming ramps 40 and 41 on its external radial surface 26a. The ring 26 is mounted free to rotate within the groove 27 and is fixed in translation, along the axis X-X' by its abutment against the opposite sides 27a and 27b of the groove 27.

In the fourth embodiment of the invention, the ramps 40 and 41 are machined directly on the external radial surface 19 of the body 11 of the male element, whereas a ring 39 bearing two catches 20 and 21 is fitted with a possibility to rotate, within a groove 42 formed on the internal radial surface 35 of the body 31 of the female element B. The ring 39 can freely rotate around the axis X-X', whereas it is fixed in translation along this axis, since it comes into abutment against the opposite sides 42a and 42b of the groove 42.

The second, third and fourth embodiments function in a way similar to the one described with respect to the first embodiment.

Figure 11:
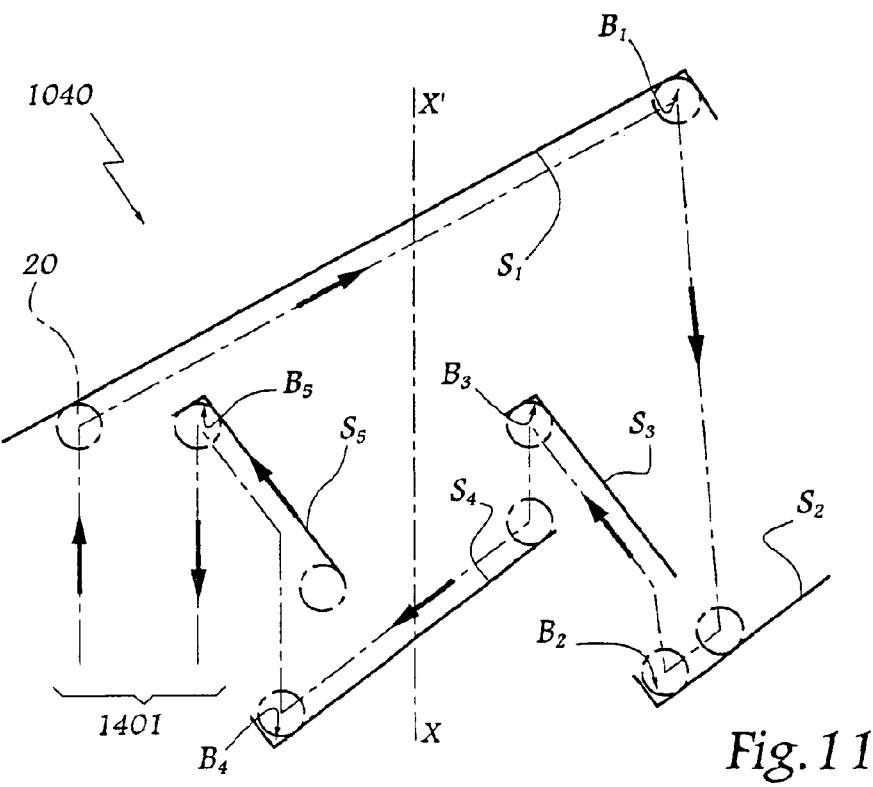
FIG. 11 is a view similar to FIG. 7, for a connection according to a fifth form of embodiment of the invention

In the representation of FIG. 11, a ramp 1040 is formed and delimited by surfaces $S_1$ to $S_5$ of which each is terminated by a stop $B_1$ to $B_5$. In fact, the stops $B_2$ and $B_4$ are seats equivalent to seats 406 and 411 of the first embodiment, while the stops $B_1$, $B_3$ and $B_5$ correspond to hollows in which the projecting parts may be reoriented by sliding on a surface $S_1$, $S_3$ or $S_5$ to go in the direction of another surface $S_2$, $S_4$ or in the direction of the exit of the ramp 1040.

Another difference with respect to the first embodiment resides in the fact that the ramp 1040 has a common zone 1401 for entrance and exit of a projecting element, of the type such as stud 20.

FIG. 12 shows a sixth form of embodiment in which six surfaces $S_1$ to $S_6$ inclined with respect to a longitudinal axis X-X' of the connection define five stops $B_1$ to $B_5$ of which two, stops $B_2$ and $B_4$ constitute seats for retaining a projecting part, three other stops $B_1$, $B_3$ and $B_5$ constituting zones of change of direction of the projecting part inside the ramp 4040 thus formed. As in the second and fourth embodiment, the entrance and exit of the ramp 4040 are constituted by a common zone 4401.

In the forms of embodiment of FIGS. 11 and 12, the surfaces $S_1$ to $S_6$ are located opposite the stops $B_1$ to $B_5$, being axially offset with respect thereto. The same observations are applicable for the surfaces and hollows identified in the first embodiment.

The invention is not limited to the examples described, and the technical characteristics of the different forms of embodiment may be combined together.

What is claimed is:

1. A quick connect coupling for joining two pipes, the coupling including a first element of a size to be received within a second element along a principal longitudinal axis of the coupling, each of said first and second elements including a generally cylindrical body, one of said first and second elements including at least one radially extending locking projection which is selectively received and moveable relative within a tortuous ramp formed in the other of said first and second elements, said tortuous ramp receiving and guiding said at least one locking projection and including a first locking seat in which said at least one locking projection is seated to lock said first and second elements together in a fluid-tight coupling when a first force is applied to initially fully insert said first element longitudinally and axially into said second element and said first force subsequently released and a second locking seat spaced axially from said first locking seat in which said at least one locking projection is seated to lock said first and second elements together, but permit decompression of fluid within the coupling, when a second force is applied longitudinally and axially to fully insert said first element within said second element and said second force thereafter released, and said tortuous ramp thereafter extending to an exit opening spaced axially from said first and second locking seats through which said locking projection passes after a third force is applied longitudinally and axially to fully insert said first element into said second element and said third force thereafter released thereby allowing separation of said first and second locking elements, and one of said at least one locking projection and said tortuous ramp being carried by a ring member that is rotatable relative to said cylindrical bodies to thereby permit said at least one locking projection to be sequentially moved relative to said tortuous ramp to said first and second locking seats and said exit by application of longitudinal forces relative to said first and second elements.

2. The coupling of claim 1, wherein said ramp is provided with an inlet opening for receiving said locking projection and an exit opening, said inlet and exit openings being oriented in two distinct radial directions relative to said principal longitudinal axis.

3. The coupling of claim 2, including two ramps and two-locking projections, said locking projections being substantially diametrically opposite, while said inlet opening of one ramp is superposed with said outlet opening of the other ramp.

4. The coupling of claim 1, wherein an inlet into said ramp and exit from said ramp are constituted by a single zone for passage of said locking projection.

5. The coupling of claim 1, wherein said ramp comprises an inlet zone which converges in a direction of a first passage which extends to a first stop zone for limiting the longitudinal movement of said first element into said second element, said stop zone being disposed opposite a surface for guiding said locking projection in a direction of said first locking seat.

6. The coupling of claim 5, wherein said ramp comprises a second stop zone disposed axially opposite a surface for guiding said locking projection in a direction of said second locking seat.

7. The coupling of claim 2, wherein said ramp is delimited adjacent said exit opening by a nose which directs said locking projection towards said first locking seat of said ramp.

8. The coupling of claim 1, wherein said ramp is formed on an internal radial surface of said ring which is mounted so as to be free to rotate and fixed in translation within said second element, and said locking projection is fixed to said first element.

9. The coupling of claim 1, wherein said ramp is formed on an internal radial surface of said body of said second element and said locking projection is fixed with said ring which is mounted to rotate and is fixed in translation around said first element.

10. The connection according to claim 1, wherein said ramp is formed on an external radial surface of said ring and said ring is mounted to rotate and is fixed in translation around the first element, and said locking projection is fixed with respect to said second element and protrudes radially towards an internal volume of said second element.

11. The connection according to claim 1, wherein said ramp is formed on an external radial surface of said first element and said locking projection is fixed with said ring, said ring being mounted to rotate and is fixed in translation within said second element, and said locking projection extends radially towards an internal volume of said second element.

12. The coupling of claim 1, in which said ramp is defined by surfaces inclined with respect to said principal longitudinal axis, and said first and second seats being oriented generally in opposing directions relative to stop surfaces of said ramp which delimit axial movement of said first element into said second element and which stop surfaces direct said at least one locking projection toward said first and second locking seats upon release of said first and second forces.

13. The coupling of claim 1, including an inlet opening to said ramp for initially guiding said at least one locking projection, and a non-return means mounted along said ramp between said inlet opening and said first locking seat to prevent said at least one locking projection from moving to said inlet opening from said first locking seat.

* * * * *